United States Patent
Maruyama et al.

(10) Patent No.: US 6,490,508 B2
(45) Date of Patent: Dec. 3, 2002

(54) SYSTEM AND METHOD FOR PRESENTING INFORMATION TO PASSENGERS IN CONVEYANCE

(75) Inventors: Kiyoyasu Maruyama, Tokyo (JP); Norishige Emoto, Tokyo (JP); Tomonori Ohasi, Tokyo (JP); Kyosuke Yoshimoto, Tokyo (JP); Tetsuya Sigeeda, Tokyo (JP); Yoichi Masubuchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/757,585

(22) Filed: Jan. 11, 2001

(65) Prior Publication Data

US 2002/0032503 A1 Mar. 14, 2002

(30) Foreign Application Priority Data

Sep. 11, 2000 (JP) ........................................ 2000-274309

(51) Int. Cl.$^7$ ................................................. G05D 1/00
(52) U.S. Cl. ................................. 701/1; 701/36; 705/1; 705/27; 340/945
(58) Field of Search ............................... 701/1, 35, 36; 340/945, 425.5; 705/1, 27

(56) References Cited

U.S. PATENT DOCUMENTS

| | | | | |
|---|---|---|---|---|
| 5,238,281 A | * | 8/1993 | Chen .......................... | 296/21 |
| 5,548,274 A | * | 8/1996 | Anderson et al. ........... | 340/468 |
| 5,664,948 A | * | 9/1997 | Dimitriadis et al. ........ | 434/307 |
| 5,751,245 A | * | 5/1998 | Janky et al. ................. | 340/993 |
| 6,009,410 A | * | 12/1999 | Lemole et al. ............... | 705/14 |
| 6,026,345 A | * | 2/2000 | Shah et al. .................. | 340/995 |
| 6,061,628 A | * | 5/2000 | Hayashi et al. ............. | 340/990 |
| 6,088,648 A | * | 7/2000 | Shah et al. .................. | 340/995 |
| 6,092,101 A | * | 7/2000 | Birell et al. ............. | 379/93.24 |
| 6,209,026 B1 | * | 3/2001 | Ran et al. ....................... | 702/3 |
| 6,286,005 B1 | * | 9/2001 | Cannon ....................... | 707/100 |
| 6,317,784 B1 | * | 11/2001 | Mackintosh et al. ........ | 709/219 |
| 6,339,745 B1 | * | 1/2002 | Novik ................... | 342/357.07 |

FOREIGN PATENT DOCUMENTS

JP         B22569025       10/1996

* cited by examiner

Primary Examiner—William A. Cuchlinski, Jr.
Assistant Examiner—Olga Hernandez
(74) Attorney, Agent, or Firm—Birch, Stewart, Kolasch & Birch, LLP

(57) ABSTRACT

A system for presenting information to passengers in a conveyance, has a computer which stores operation diagram information; a storage medium which stores a plurality of advertisement data items to be presented to the passengers; and an information presenting device. The computer obtains an operation time in each operation section on the basis of the operation diagram information and identification data for identifying the conveyance, and selects and arranges some of the advertisement data items to generate presentation data for continuously presenting information to the passengers throughout a time period corresponding to the operation time. The information presenting device reproduces the presentation data corresponding to each operation section to present the information to the passengers in each operation section of the conveyance.

17 Claims, 9 Drawing Sheets

FIG.2

OPERATION SCHEDULE (OPERATION DIAGRAM)

| TRAIN NUMBER | | 1001 | 1002 | 1003 | |
|---|---|---|---|---|---|
| STATION A1 | ARRIVAL | – | – | – | |
| | DEPARTURE | 10:00 | 11:00 | 12:00 | |
| STATION A2 | ARRIVAL | ↓ | 11:28 | 12:28 | |
| | DEPARTURE | | 11:30 | 12:30 | |
| STATION A3 | ARRIVAL | 10:58 | 12:05 | ↓ | |
| | DEPARTURE | 11:00 | 12:10 | | |
| STATION A4 | ARRIVAL | 12:00 | 13:10 | 14:00 | |
| | DEPARTURE | 12:05 | – | 14:05 | |

FIG.3

IMAGE/SOUND DATA

| | REPRODUCTION TIME (MINITE : SECOND) |
|---|---|
| DATA D1 | 55:00 |
| DATA D2 | 50:00 |
| DATA D3 | 25:00 |
| DATA D4 | 3:00 |
| DATA D5 | 1:00 |

FIG.4

REPRODUCTION INFORMATION

| TRAIN NUMBER 1001 | | |
|---|---|---|
| REPRODUCTION DATA | REPRODUCTION START TIME | REPRODUCTION END TIME |
| DATA D$_1$ | 10:02 | 10:57 |
| DATA D$_2$ | 11:03 | 11:53 |
| DATA D$_4$ | 11:54 | 11:57 |
| ⋮ | ⋮ | ⋮ |

FIG.5

PAST REPRODUCTION INFORMATION

| TRAIN NUMBER | REPRODUCTION DATA | REPRODUCTION START DATE AND TIME | REPRODUCTION END DATE AND TIME |
|---|---|---|---|
| 1001 | DATA D$_1$ | 7/30 10:03 | 7/30 10:53 |
| 1001 | DATA D$_2$ | 7/30 11:03 | 7/30 11:53 |
| 1001 | DATA D$_4$ | 7/30 11:54 | 7/30 11:57 |
| | | ⋮ | ⋮ |

FIG.8

OPERATION INFORMATION

| TRAIN NUMBER 1001 | | OPERATION SCHEDULE | OPERATION RECORD |
|---|---|---|---|
| STATION A1 | ARRIVAL | – | – |
| | DEPARTURE | 10:00 | 10:02 |
| STATION A2 | ARRIVAL | ↓ | ↓ |
| | DEPARTURE | | |
| STATION A3 | ARRIVAL | 10:58 | 11:02 |
| | DEPARTURE | 11:00 | 11:10 |
| STATION A4 | ARRIVAL | 12:00 | |
| | DEPARTURE | 12:05 | |
| ⋮ | ⋮ | ⋮ | ⋮ |

FIG.9

UPDATED REPRODUCTION INFORMATION

| TRAIN NUMBER 1001 | | |
|---|---|---|
| REPRODUCTION DATA | REPRODUCTION START TIME | REPRODUCTION END TIME |
| DATA D1 | 10:03 | 10:53 |
| DATA D2 | 11:13 | 12:03 |
| DATA D4 | 12:04 | 12:07 |
| ⋮ | ⋮ | ⋮ |

FIG.11

PAST REPRODUCTION INFORMATION

| TRAIN NUMBER | REPRODUCTION DATA | REPRODUCTION START DATE AND TIME | REPRODUCTION END DATE AND TIME | VEHICLE INFORMATION (ESTIMATED NUMBER OF PASSENGERS) |
|---|---|---|---|---|
| 1001 | DATA D1 | 7/30 10:03 | 7/30 10:53 | 100 |
| 1001 | DATA D2 | 7/30 11:03 | 7/30 11:53 | 50 |
| 1001 | DATA D4 | 7/30 11:54 | 7/30 11:57 | 50 |
| ⋮ | ⋮ | ⋮ | ⋮ | ⋮ |

FIG.12

REPRODUCTION PRIORITY INFORMATION

| | REPRODUCTION TIME (MINITE : SECOND) | PRIORITY LEVEL |
|---|---|---|
| DATA D1 | 55:00 | 8 |
| DATA D2 | 50:00 | 5 |
| DATA D3 | 25:00 | 3 |
| DATA D4 | 3:00 | 10 |
| DATA D5 | 1:00 | 9 |
| ⋮ | ⋮ | ⋮ |

SYSTEM AND METHOD FOR PRESENTING INFORMATION TO PASSENGERS IN CONVEYANCE

BACKGROUND OF THE INVENTION

The present invention relates to a system and a method for presenting image information (or sound information or image/sound information) to passengers in a conveyance (or transportation) such as a railway vehicle (train), a bus, a ship, and an aircraft.

A prior art system for presenting information in a railroad station or a train is disclosed in Japanese Patent Publication No. 2,569,025. FIG. 13 is a block diagram showing the system. The administrator inputs a command to a controlling calculator 901 using a keyboard 902 and a monitor 903 to operate the system. The image recorded by a video tape recorder 922, on a video disk 924, or in video memory 925, is displayed on a display unit 941 in a train or a ticket dispenser with a display unit 942 installed in a station by commands of a signal selector 931 and control units 921 and 923. In FIG. 13, a reference numeral 904 denotes a hard disk, 905 denotes a printer, 911 denotes a communication control unit, and 926 denotes a video signal converter.

The prior art system described above, however, does not have a means for linking the image display with the train operation information. If an one-hour image sequence is presented on a display unit in a train and if the train stops at stations every 10 minutes, a drawback to the sponsor is that just a part of the image sequence is presented to alighting passengers, and the passengers feel annoyed at or dissatisfied with the fact that they must alight from the train while the reproduction of the image sequence is in progress.

SUMMARY OF THE INVENTION

It is an object of the present invention to provide a system and a method for presenting information to passengers in a conveyance, which can generate the presentation data to be presented to passengers, depending on the operation schedule of the conveyance.

A system for presenting information to passengers in a conveyance, comprising: a computer which is provided in the conveyance and stores operation diagram information; a storage medium which stores a plurality of advertisement data items to be presented to the passengers; and an information presenting device which presents information to the passengers; wherein the computer obtains an operation time in each operation section of the conveyance on the basis of the operation diagram information and identification data for identifying the conveyance after the identification data is input, and selects and arranges some of the advertisement data items stored in the storage medium to generate presentation data for continuously presenting information to the passengers throughout a time period corresponding to the operation time; and the information presenting device reproduces the presentation data corresponding to each operation section of the conveyance to present the information to the passengers in each operation section of the conveyance.

Further, the computer may store information related to the presentation data which has been presented to the passengers by the information presenting device; and the system may further comprise a past presentation information providing device for outputting the information related to the presentation data, which has been presented to the passengers.

Furthermore, the computer may store information related to the presentation data which has been presented to the passengers by the information presenting device; and the system may further comprise a communication control unit for sending the information related to the presentation data, which has been presented to the passengers.

The system may further comprise an operation status acquisition unit which receives signals related to passing location and time of the conveyance; wherein the computer updates a reproduction start time of the presentation data to be presented to the passengers in each operation section of the conveyance in accordance with the signals received by the operation status acquisition unit.

The system may further comprise a passenger information detection unit which is provided in the conveyance and measures total weight of the passengers; wherein the computer changes the presentation data to be presented to the passengers in accordance with the total weight detected by the passenger information detection unit.

The system may further comprise a passenger information detection unit which is provided in the conveyance and measures total weight of the passengers; wherein the computer stores the total weight detected by the passenger information detection unit.

Further, items of the presentation data may be assigned reproduction priority, and the presentation data are reproduced in order of the reproduction priority.

The information presenting device may include a reproducing unit for outputting video/audio signals, a monitor for displaying an image, and a speaker for outputting sound.

A method for presenting information to passengers in a conveyance, comprising the steps of: recording operation diagram information in an information presenting system provided in a conveyance; inputting identification data for identifying the conveyance to the information presenting system; obtaining an operation time in each operation section of the conveyance on the basis of the operation diagram information and the identification data; selecting and arranging some of advertisement data items stored in a storage medium to generate presentation data for continuously presenting information to the passengers throughout a time period corresponding to the operation time; and reproducing the presentation data corresponding to each operation section of the conveyance to present the information to the passengers in each operation section of the conveyance.

The method may further comprise the steps of: storing information related to the presentation data, which has been presented to the passengers; and outputting the information related to the presentation data.

The method may further comprise the steps of: storing information related to the presentation data, which has been presented to the passengers; and sending the information related to the presentation data to the outside of the conveyance.

The method may further comprise the steps of: receiving signals related to passing location and time of the conveyance; and updating a reproduction start time of the presentation data to be presented to the passengers in each operation section of the conveyance in accordance with the signals related to passing location and time.

The method may further comprise the steps of: measuring total weight of the passengers; and changing the presentation data to be presented to the passengers in accordance with the total weight.

The method may further comprise the steps of: measuring total weight of the passengers; and storing the total weight.

The method may further comprise the steps of: assigning reproduction priority to items of the presentation data; and reproducing the presentation data in order of the reproduction priority.

With the above-described system or method, the video/audio data suited to the operation of a train can be provided, the sponsor can present the whole advertisement data to the passengers, and the passengers can be saved from feeling annoyed at or dissatisfied with the fact that they have to alight from the conveyance halfway through the data presentation.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 shows a part of the operation diagram used in the system in accordance with the first embodiment;

FIG. 3 shows the video/audio data used in the system in accordance with the first embodiment;

FIG. 4 shows the reproduction information in the system in accordance with the first embodiment;

FIG. 5 is a block diagram showing the configuration of a system for presenting information in accordance with a second embodiment of the present invention;

FIG. 8 shows the operation information in the system in accordance with the fourth embodiment;

FIG. 9 shows the reproduction information updated in the system in accordance with the fourth embodiment;

FIG. 11 shows the past reproduction information in the system in accordance with the fifth embodiment;

FIG. 12 shows the reproduction priority information in the system for presenting information in accordance with a sixth embodiment of the present invention.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
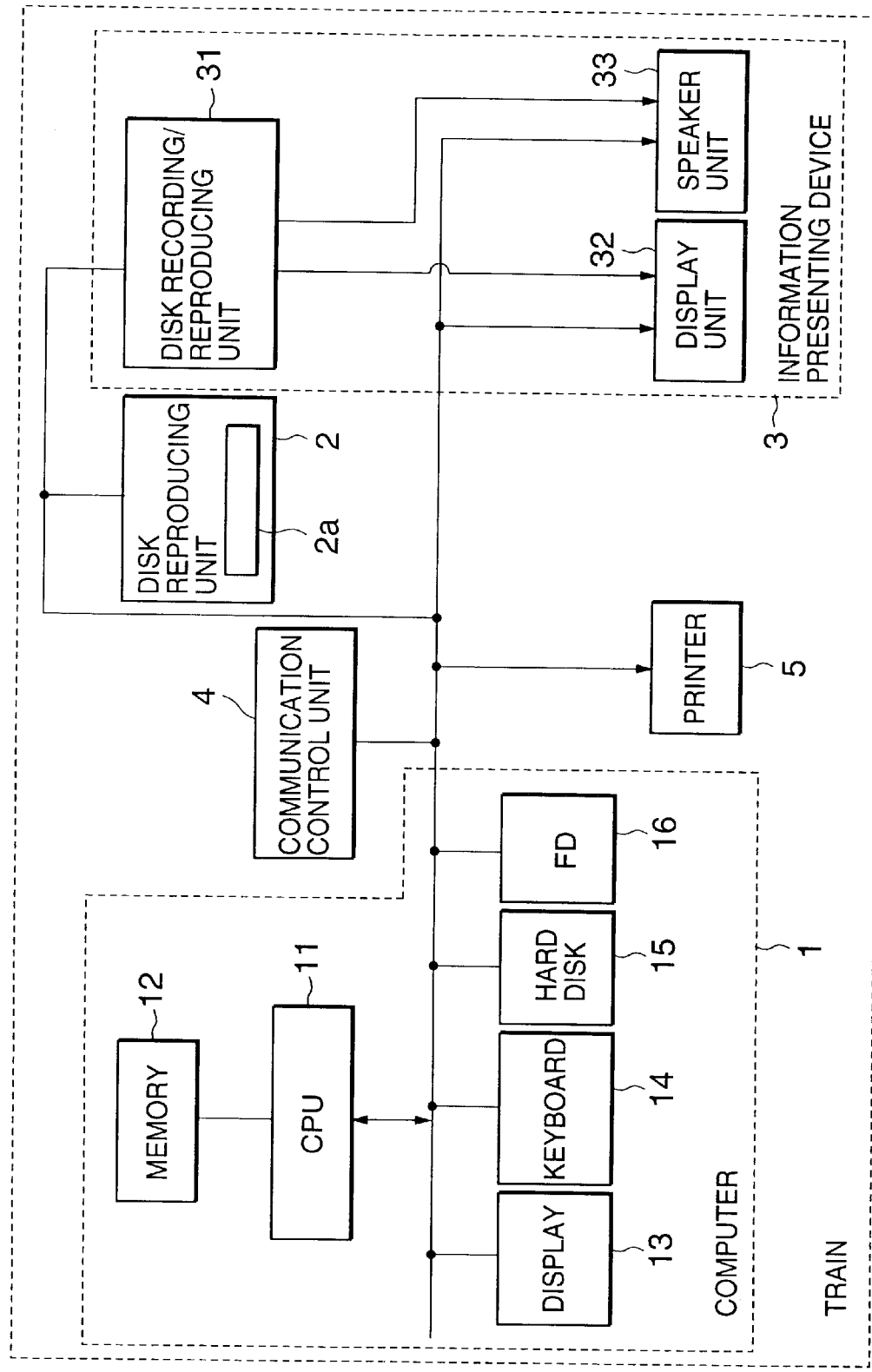
FIG. 1 is a block diagram showing the configuration of a system for presenting information in accordance with a first embodiment of the present invention.

FIG. 1 is a block diagram showing the configuration of a system for presenting information in accordance with a first embodiment of the present invention (or a system for implementing a method for presenting information in accordance with the first embodiment).

The system for presenting information in accordance with the first embodiment has a computer 1 provided in a train as a conveyance, a disk reproducing unit 2 which reproduces an optical disk 2a on which a plurality of advertisement data items for constituting the video/audio data to be presented to passengers are recorded, and an information presenting device 3 which presents information to passengers in a conveyance. In FIG. 1, a reference numeral 4 denotes a communication control unit for sending and receiving data to or from the outside by radio waves or through a line, and 5 denotes a printer. The conveyance is not limited to trains and may be any conveyance that repeatedly runs and stops according to a predetermined operation diagram such as buses, ships, and aircraft. In addition, the storage medium on which the advertisement data is recorded is not limited to the optical disk 2a and may be any other storage medium such as a magnetic tape and a magnetic disk. Moreover, the disk reproducing unit 2 may be configured as a part of the computer 1.

The computer 1 has a central processing unit (CPU) 11, a memory 12, a display 13, a keyboard 14, a hard disk (fixed disk) 15, and a flexible disk drive (FD) 16. The computer 1 is installed in the driver's cab of a train, for instance.

The information presenting device 3 has a disk recording/reproducing unit 31 which records and reproduces data on a disk such as a DVD-RAM, a display unit 32 which displays an image, and a speaker unit 33 which outputs sound. The disk recording/reproducing unit 31 is disposed in the driver's cab of the train, for instance. The display unit 32 is a liquid crystal display monitor disposed for each seat of a railway passenger car, on the wall of the train, or the like. The speaker unit 33 is, for instance, a pair of headphones provided for each set of a railway passenger car. Both the display unit 32 and the speaker unit 33 do not have to be provided, and just either of them may be provided. In addition, the display unit 32 and the speaker unit 33 may be incorporated in a single unit. Further, the disk recording/reproducing unit 31 may be configured as a part of the computer 1. Furthermore, the CPU 11 and the hard disk 15 of the computer 1 may be provided with a video/audio data recording/reproducing function, instead of presenting the disk recording/reproducing unit 31.

The operation of the system in accordance with the first embodiment (or the processing procedure of the method in accordance with the first embodiment) will next be described. First, the operation diagram information is input from the magnetic disk inserted in the FD 16 or through the communication control unit 4 and is stored in the hard disk 15. This operation is performed each time the operation diagram is changed. FIG. 2 shows a part of the operation diagram. FIG. 2 indicates that a train having a train number 1001 is scheduled to leave station $A_1$ at 10:00, pass station $A_2$, arrive at station $A_3$ at 10:58, leave station $A_3$ at 11:00, arrive at station $A_4$ at 12:00, and leave station $A_4$ at 12:05. The operation diagram information includes the scheduled operation information of many trains such as a train having a train number 1002 and a train having a train number 1003.

Next, the administrator (railway crew) inputs a train number identifying the train (1001 shown in FIG. 2, for instance) using the keyboard 14 and stores the number in the hard disk 15. This operation is performed before the operation of the train starts (that is, before the train leaves the starting station).

The CPU 11 obtains the operation time in each operation section of the train, on the basis of the operation diagram and the train number stored in the hard disk 15.

Next, the CPU 11 selects and arranges advertisement data items taken from the optical disk 2a of the disk reproducing unit 2 to generate the video/audio data for continuously presenting image/sound to the passengers throughout the time period corresponding to the operation time of each operation section. It is preferable that overlap among advertisement data is avoided in the same operation section, so that the passengers would not be bored. It is also desirable that advertisement data is selected so that the same image/sound is not reproduced in different operation sections (adjacent operation sections, especially). For instance, if each advertisement data item recorded on the optical disk 2a has a reproduction time of 3 minutes and if the operation time of a certain operation section is 15 minutes, the video/audio data is generated by arranging five advertisement data items in a certain order (an order predetermined by ranks assigned to the advertisement data items and ranks assigned to the advertisement data providers (sponsors), for instance) in such a manner that the same image/sound will not be reproduced in different operation sections. The generated video/audio data is temporarily stored in the hard disk 15. FIG. 3 shows an example of video/audio data items $D_1$ and $D_2$, and soon stored in the hard disk 15.

Then, video/audio data $D_1$, $D_2$, . . . stored in the hard disk 15 is recorded on an optical disk by the disk recording/reproducing unit 31. In each operation section of the train, the disk recording/reproducing unit 31 reproduces specified video/audio data in a predetermined time as controlled by the CPU 11 and outputs the image/sound from the display unit 32 and the speaker unit 33. The processing to record video/audio data $D_1$, $D_2$, . . . by the disk recording/reproducing unit 31 on the optical disk may be eliminated, and instead, the video/audio data may be directly reproduced from video/audio data $D_1$, $D_2$, . . . stored on the hard disk 15, and the image/sound may be output from the display unit 32 and the speaker unit 33.

Since the train having the train number 1001 leaves station $A_1$ at 10:00 and arrives at station $A_3$ at 10:58, for instance, video/audio data of up to 58 minutes can be continuously reproduced, but no video/audio data should be reproduced immediately after departure or immediately before arrival. So, between station $A_1$ and station $A_3$, video/audio data $D_1$ having a reproduction time of 55 minutes is reproduced. Between station $A_3$ and station $A_4$, data of up to one hour can be continuously reproduced. Therefore, video/audio data $D_2$ having a reproduction time of 50 minutes and video/audio data $D_4$ having a reproduction time of 3 minutes are reproduced in that order. Between station $A_3$ and station $A_4$, video/audio data $D_1$ having a reproduction time of 55 minutes can be reproduced, but the video/audio data that is different from the information reproduced before should be reproduced because the reproduction of the same video/audio data would cause the passengers in the train to be bored. FIG. 4 shows the video/audio data and the reproduction start time and end time of the disk recording/reproducing unit 31.

As has been described above, the system and method for presenting information in accordance with the first embodiment can prevent the same image from being provided repeatedly and the conveyance from stopping while the image is being provided, by linking the reproduction of the video/audio data with the operation schedule of the train. Accordingly, the drawback to the sponsor and the dissatisfaction of passengers can be resolved.

Second Embodiment

A system for presenting information in accordance with a second embodiment (or a system implementing a method for presenting information in accordance with the second embodiment) is the same as the system and method in accordance with the first embodiment, except for the contents of processing by the CPU 11. Accordingly, the second embodiment is described with reference to FIG. 1.

The system in accordance with the second embodiment is different from that in accordance with the first embodiment in that when the information presenting device 3 reproduces the video/audio data, the information related to the reproduced video/audio data (past reproduction information) is stored in the hard disk 15. FIG. 5 shows the past reproduction information stored in the hard disk 15. The past reproduction information includes the number of the train in which reproduction is performed, advertisement data, reproduction start date and time, and reproduction end date and time. The past reproduction information is printed by the printer 5 when needed.

As has been described above, the system and method in accordance with the second embodiment can print the past reproduction information, so that the fact that the advertisement was presented to the passengers, the number of times the advertisement was presented, a time period during which the advertisement was presented, and other information can be provided to the sponsor.

Except for the above respects, the second embodiment is the same as the first embodiment described earlier.

Third Embodiment

Figure 6:
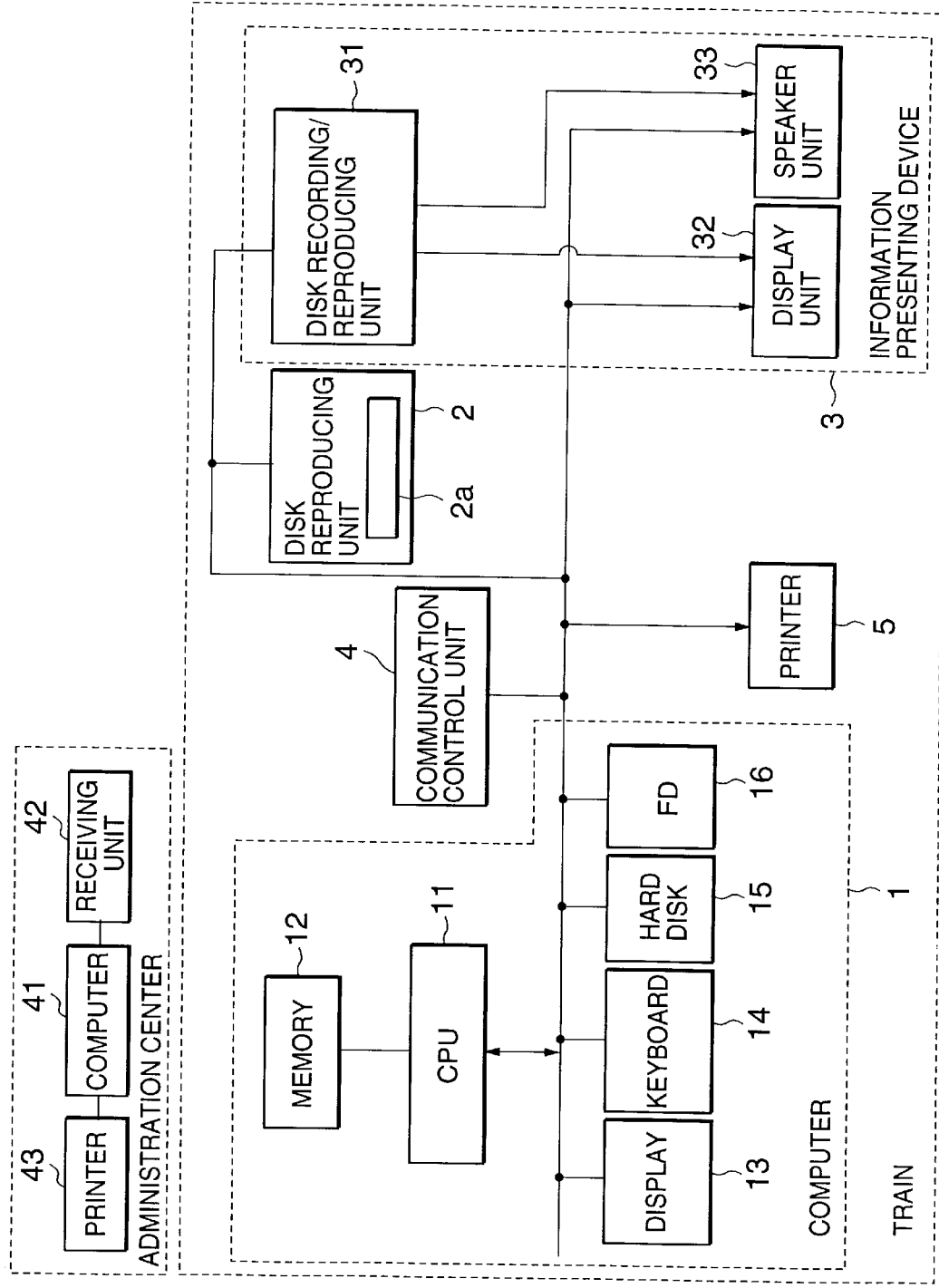
FIG. 6 is a block diagram showing the configuration of a system for presenting information in accordance with a third embodiment of the present invention.

FIG. 6 is a block diagram showing the configuration of a system for presenting information in accordance with a third embodiment of the present invention (or a system implementing a method for presenting information in accordance with the third embodiment). In FIG. 6, those parts identical to or equivalent to the parts in FIG. 1 are identified with the same reference numerals.

The system in accordance with the third embodiment is different from that in accordance with the second embodiment in that the past reproduction information stored in the hard disk 15 is sent to the computer 41 of the administration center by the communication control unit 4. In FIG. 6, a reference numeral 42 denotes a receiving unit, and 43 denotes a printer for printing the past reproduction information.

As has been described above, the administration center receives the past reproduction information in the system and method in accordance with the third embodiment, so that the past reproduction information can be immediately known. In addition, because the past reproduction information can be printed in the administration center, the fact that the advertisement was presented, the number of times the advertisement was presented, a time period during which the advertisement was presented, and other information can be quickly provided to the sponsor.

Except for the above respects, the third embodiment is the same as the first or second embodiment described above.

Fourth Embodiment

Figure 7:
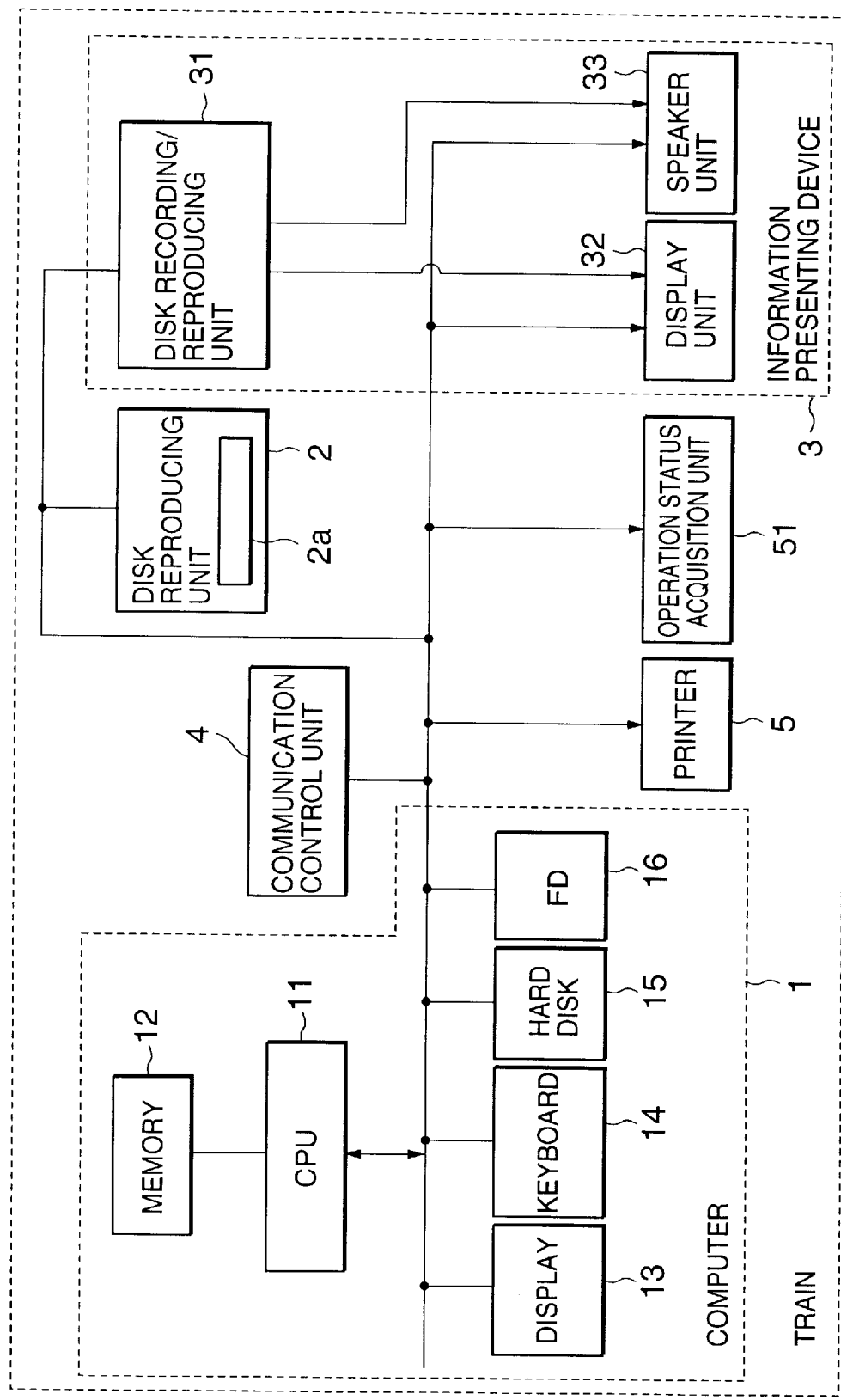
FIG. 7 is a block diagram showing the configuration of a system for presenting information in accordance with a fourth embodiment of the present invention.

FIG. 7 is a block diagram showing the configuration of a system for presenting information in accordance with a fourth embodiment of the present invention (or a system implementing a method for presenting information in accordance with the fourth embodiment). In FIG. 7, those parts identical to or equivalent to the parts in FIG. 1 are identified with the same reference numerals.

The system in accordance with the fourth embodiment is different from that in accordance with the first embodiment in that the operation status acquisition unit 51 is provided. The operation status acquisition unit 51 is a unit installed in a train in order to acquire the passing location and time of the train. The operation status acquisition unit 51 receives the signals related to the station information, arrival time information, and departure time information sent from the transmitting unit installed in each station. Information may be input to the operation status acquisition unit 51 by manual operations of the railway crew.

The CPU 11 updates the reproduction start time and reproduction end time of the video/audio data, depending on the operation status (operation record) acquired by the operation status acquisition unit 51. FIG. 8 shows an example of the operation schedule and operation record. FIG. 8 indicates the operation information of the train having the train number 1001 at the time of departure from station $A_3$. In this example, the train having the train number 1001 leaves station $A_3$ at 11:10, which is 10 minutes behind schedule. Because this operation information is successively updated according to the operation of the train, the time of arrival at station $A_3$ (11:02 and 11:10) is not recorded before the train arrives at station $A_3$.

In the fourth embodiment, the reproduction of video/audio data $D_1$ is completed before the train having the train number 1001 arrives at station $A_3$.

Next, the reproduction of video/audio data $D_2$ is scheduled to begin at 11:03, but the CPU 11 references the operation information acquired by the operation status acquisition unit 51 prior to the reproduction of video/audio data $D_2$. At 11:03, the operation information just up to the time of arrival at station $A_3$ is recorded, so that the CPU 11 judges the train to be staying at a station and does not start the reproduction of video/audio data $D_2$.

At the same time, the CPU 11 updates the reproduction information on the basis of the past operation record acquired by the operation status acquisition unit 51. The reproduction information is updated so that the video/audio data is reproduced after the train leaves a station. FIG. 9 shows the updated reproduction information. When the departure of the train at 11:10 is recorded as the operation information, the CPU 11 creates newly updated reproduction information, as shown in FIG. 9. As shown in FIG. 9, the reproduction start time and reproduction end time of video/audio data $D_2$ and $D_3$ are updated.

As has been described above, the system and method in accordance with the fourth embodiment can prevent the conveyance from stopping while an image sequence is being presented even if the train does not run as scheduled, so that the drawback to the sponsor and the dissatisfaction of passengers can be resolved.

Except for the above respects, the fourth embodiment is the same as any of the first, second or third embodiment described above.

Fifth Embodiment

Figure 10:
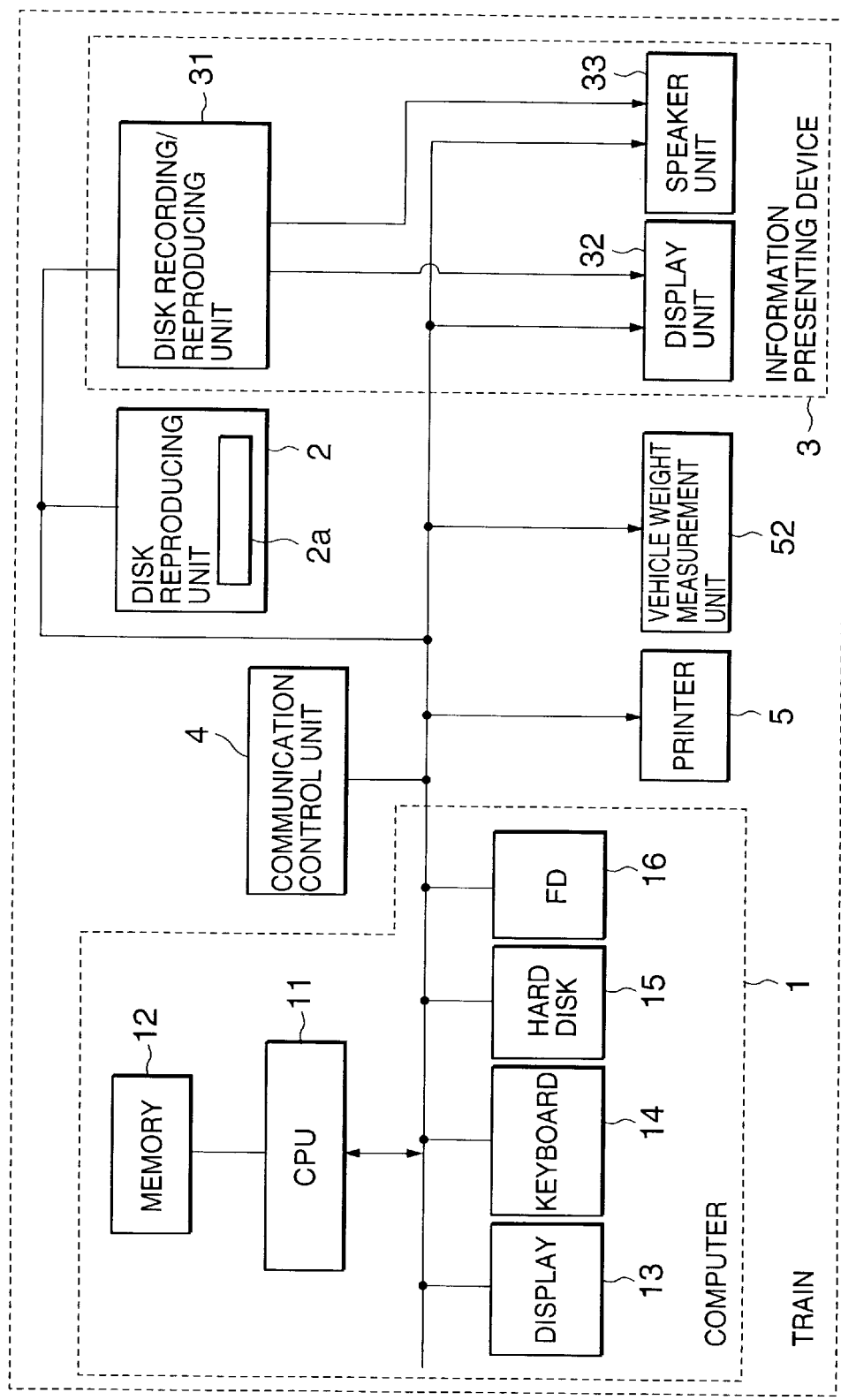
FIG. 10 is a block diagram showing the configuration of a system for presenting information in accordance with a fifth embodiment of the present invention.
Figure 13:
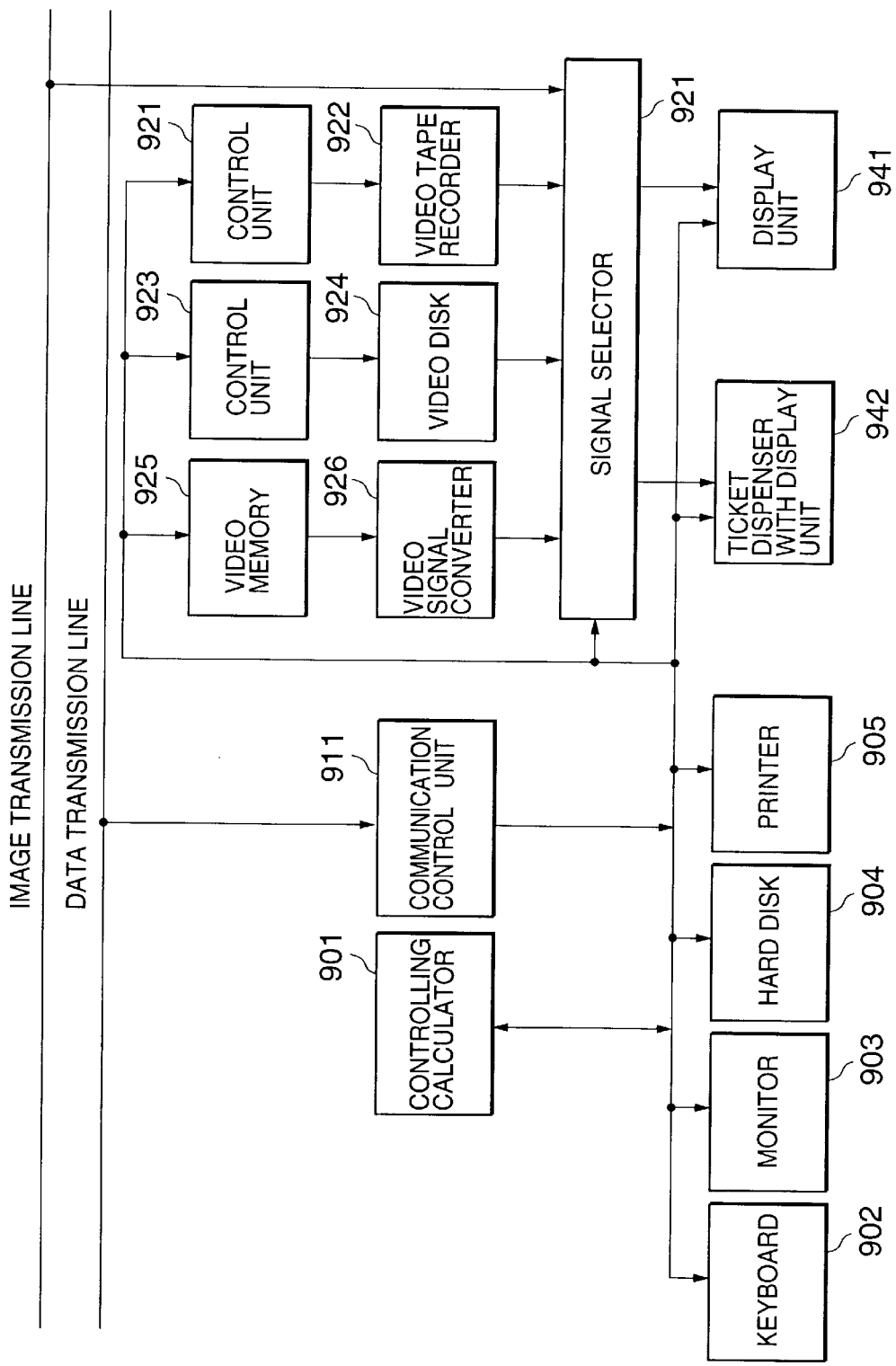
FIG. 13 is a block diagram showing the configuration of a prior art system for presenting information.

FIG. 10 is a block diagram showing the configuration of a system for presenting information in accordance with a fifth embodiment of the present invention (or a system implementing a method for presenting information in accordance with the fifth embodiment). In FIG. 10, those parts identical to or equivalent to the parts in FIG. 1 are identified with the same reference numerals.

The system in accordance with the fifth embodiment is different from that in accordance with the first embodiment in that the vehicle weight measurement unit 52 is included. The vehicle weight measurement unit 52 is a weight measurement unit mounted in each vehicle. This system estimates the number of passengers within each vehicle on the basis of the measured weight.

The train number, advertisement data, reproduction start date and time, and reproduction end date and time are recorded as the past reproduction information on the hard disk 15 in the second embodiment while the estimated number of passengers obtained from the vehicle information (vehicle weight information) can be recorded as well in the fifth embodiment. FIG. 11 shows the information recorded on the hard disk 15.

In the fifth embodiment, the reproduction information is updated on the basis of the weight information measured by the vehicle weight measurement unit 52 in addition to the operation diagram, train number, and video/audio data. For instance, if a sponsor presenting video/audio data as advertisement makes a request for reproducing the advertisement while there are many passengers (for instance, if it is requested that the image sequence be reproduced while the number of passengers is estimated to be 100 or greater), the corresponding video/audio data can be reproduced when the requirement of the number of passengers is satisfied. By recording the estimated number of passengers on the hard disk 15, the number of passengers to which the image sequence was presented can be reported to the sponsor.

As has been described above, the system and method in accordance with the fifth embodiment can change the information to be reproduced, depending on the number of passengers. Together with the contents of the reproduced advertisement and the reproduction time, the number of passengers who were present when the image was reproduced can be reported to the sponsor.

Except for the above respects, the fifth embodiment is the same as any of the first to fourth embodiments described above.

Sixth Embodiment

A system for presenting information in accordance with a sixth embodiment (or a system implementing a method for presenting information in accordance with the sixth embodiment) is the same as that in accordance with any of the first to fifth embodiments described above, except for the contents of processing by the CPU 11. Accordingly, the sixth embodiment is described with reference to FIG. 1.

If the reproduction priority information (priority level) is added to each item of the video/audio data $D_1$, $D_2$, ... and if reproduction information is created, depending on the operation time, the system in accordance with the sixth embodiment reproduces the information in descending order of priority level within the range of operation time. FIG. 12 shows an example of the reproduction priority information, which is used to indicate that if the priority level ranges from a maximum of 10 to a minimum of 1, data D, should be reproduced prior to data $D_2$. By assigning the priority levels as described above, different advertisement rates can be set for sponsors. In addition, if the estimated number of passengers who were on board when the video/audio data was reproduced is recorded, as shown in FIG. 12, the information can be used as the information to be reported to the sponsor.

As has been described above, the system and method in accordance with the sixth embodiment can change the information to be reproduced, depending on the priority level. In other words, the system and the method of the sixth embodiment can present the presentation data in order of priority.

Except for the above respects, the sixth embodiment is the same as any of the first to fifth embodiments described above.

What is claimed is:

1. A system for presenting information to passengers in a conveyance, comprising:

a computer which is provided in said conveyance and stores operation diagram information;

a storage medium which stores a plurality of advertisement data items to be presented to the passengers; and an information presenting device which presents information to the passengers;

wherein said computer obtains an operation time in each operation section of said conveyance on the basis of said operation diagram information and identification data for identifying said conveyance after said identification data is input, and selects and arranges some of said advertisement data items stored in said storage medium to generate presentation data for continuously presenting information to the passengers throughout a time period corresponding to said operation time;

said information presenting device reproduces said presentation data corresponding to each operation section of said conveyance to present said information to the passengers in each operation section of said conveyance; and said system further comprising a passenger information detection unit which is provided in said conveyance and measures total weight of the passengers;

wherein said computer changes said presentation data to be presented to the passengers in accordance with said total weight detected by said passenger information detection unit.

2. The system of claim 1, wherein said computer stores information related to said presentation data which has been presented to the passengers by said information presenting device;

said system further comprising a past presentation information providing device for outputting said information related to said presentation data, which has been presented to the passengers.

3. The system of claim 1, wherein said computer stores information related to said presentation data which has been presented to the passengers by said information presenting device;

said system further comprising a communication control unit for sending said information related to said presentation data, which has been presented to the passengers.

4. The system of claim 1, further comprising an operation status acquisition unit which receives signals related to passing location and time of said conveyance;

wherein said computer updates a reproduction start time of said presentation data to be presented to the passengers in each operation section of said conveyance in accordance with said signals received by said operation status acquisition unit.

5. The system of claim 1, wherein items of said presentation data are assigned reproduction priority, and said presentation data are reproduced in order of said reproduction priority.

6. The system of claim 1, wherein said information presenting device includes a reproducing unit for outputting video/audio signals, a monitor for displaying an image, and a speaker for outputting sound.

7. The system of claim 1, wherein said operation diagram information further comprises an operation schedule for the conveyance as it navigates a route according to the operation diagram.

8. The system of claim 7, wherein said operation diagram information further comprises the operation schedule for a plurality of conveyances having a plurality of operation schedules corresponding to a predetermined navigation route.

9. A system for presenting information to passengers in a conveyance, comprising:

a computer which is provided in said conveyance and stores operation diagram information;

a storage medium which stores a plurality of advertisement data items to be presented to the passengers; and an information presenting device which presents information to the passengers;

wherein said computer obtains an operation time in each operation section of said conveyance on the basis of said operation diagram information and identification data for identifying said conveyance after said identification data is input, and selects and arranges some of said advertisement data items stored in said storage medium to generate presentation data for continuously presenting information to the passengers throughout a time period corresponding to said operation time;

said information presenting device reproduces said presentation data corresponding to each operation section of said conveyance to present said information to the passengers in each operation section of said conveyance; and said system further comprising a passenger information detection unit which is provided in said conveyance and measures total weight of the passengers;

wherein said computer stores said total weight detected by said passenger information detection unit.

10. A method for presenting information to passengers in a conveyance, comprising the steps of:

recording operation diagram information in an information presenting system provided in a conveyance;

inputting identification data for identifying said conveyance to said information presenting system;

obtaining an operation time in each operation section of said conveyance on the basis of said operation diagram information and said identification data;

selecting and arranging some of advertisement data items stored in a storage medium to generate presentation data for continuously presenting information to the passengers throughout a time period corresponding to said operation time;

reproducing said presentation data corresponding to each operation section of said conveyance to present said information to the passengers in each operation section of said conveyance; and storing information related to said presentation data, which has been presented to the passengers; and sending said information related to said presentation data to the outside of said conveyance.

11. The method of claim 10, further comprising the steps of:

outputting said information related to said presentation data.

12. The method of claim 10, further comprising the steps of:

recording operation diagram information comprising an operation schedule for the conveyance as it navigates a route according to the operation diagram.

13. The method of claim 12, further comprising the steps of:

recording operation diagram information comprising the operation schedule for a plurality of conveyances having a plurality of operation schedules corresponding to a predetermined navigation route.

14. A method for presenting information to passengers in a conveyance, comprising the steps of:

recording operation diagram information in an information presenting system provided in a conveyance;

inputting identification data for identifying said conveyance to said information presenting system;

obtaining an operation time in each operation section of said conveyance on the basis of said operation diagram information and said identification data;

selecting and arranging some of advertisement data items stored in a storage medium to generate presentation data for continuously presenting information to the passengers throughout a time period corresponding to said operation time;

reproducing said presentation data corresponding to each operation section of said conveyance to present said information to the passengers in each operation section of said conveyance;

receiving signals related to passing location and time of said conveyance; and updating a reproduction start time of said presentation data to be presented to the passengers in each operation section of said conveyance in accordance with said signals related to passing location and time.

15. A method for presenting information to passengers in a conveyance, comprising the steps of:

recording operation diagram information in an information presenting system provided in a conveyance;

inputting identification data for identifying said conveyance to said information presenting system;

obtaining an operation time in each operation section of said conveyance on the basis of said operation diagram information and said identification data;

selecting and arranging some of advertisement data items stored in a storage medium to generate presentation data for continuously presenting information to the passengers throughout a time period corresponding to said operation time;

reproducing said presentation data corresponding to each operation section of said conveyance to present said information to the passengers in each operation section of said conveyance;

measuring total weight of the passengers; and changing said presentation data to be presented to the passengers in accordance with said total weight.

16. A method for presenting information to passengers in a conveyance, comprising the steps of:

recording operation diagram information in an information presenting system provided on a conveyance;

inputting identification data for identifying said conveyance to said information presenting system;

obtaining an operation time in each operation section of said conveyance on the basis of said operation diagram information and said identification data;

selecting and arranging some of advertisement data items stored in a storage medium to generate presentation data for continuously presenting information to the passengers throughout a time period corresponding to said operation time;

reproducing said presentation data corresponding to each operation section of said conveyance to present said information to the passengers in each operation section of said conveyance;

measuring total weight of the passengers; and storing said total weight.

17. The method of claim 10, further comprising the steps of:

assigning reproduction priority to items of said presentation data; and reproducing said presentation data in order of said reproduction priority.

* * * * *